Patented Aug. 2, 1927.

1,637,838

UNITED STATES PATENT OFFICE.

FRANCIS M. SIMONDS, OF NEW YORK, N. Y., ASSIGNOR OF ONE-HALF TO A. FILLMORE HYDE, OF NEW YORK, N. Y.

METHOD OF TREATING ORES.

No Drawing.   Application filed January 27, 1925. Serial No. 5,159.

My present invention has relation to a new and useful process for the treatment of various ores. It finds an application of especial interest and importance in connection with so-called "complex ores," and will be hereinafter described as used with these; although the invention in its broader aspects is concerned with principles of operation applicable to the simpler ores, as will be hereinafter explained, and as set forth by my claims.

The nature of the present invention can be well exemplified by describing its use in connection with a certain complex ore which I have treated in accordance with the invention with excellent results. The ore in question contains principally iron, copper, lead and zinc sulphides, with small quantities of silver embedded in a hard siliceous gangue.

It has been common hitherto as a preliminary step, to roast sulphide ores of this general character, driving off the sulphur with the formation of $SO_2$ and oxidizing the metals in the ore. It is one of the minor objects of my invention to make it possible to save a considerable portion of the sulphur as such, incidentally reducing the nuisance created by the discharge of $SO_2$ into the atmosphere.

As a preliminary step, not essential to my invention, I subject the coarsely broken ore to a temperature of not over seven hundred degrees centigrade in a slightly reducing or neutral atmosphere. About one half of the sulphur is driven off and can be collected by any well known process. At the same time the ore is much softened and the subsequent grinding is greatly facilitated.

This process may be varied to advantage, in a manner and with results that I believe to be novel, by heating to from about 500 deg. C. to about 600 degrees in a slightly reducing or neutral atmosphere, and then passing a slightly oxidizing gas through the mass. I have found by long experiment that, owing to reactions not perfectly understood, very little $SO_2$ is evolved under these circumstances, but that a considerable rise of temperature is observed, and sulphur is driven off in elemental form.

The ore, either after the above treatment or without it, is then ground to a suitable fineness depending upon the nature of the ore. I have had good results with the particular ore above specified by a grinding so that the largest particles will just pass through an eight mesh screen.

The ore in this condition is heated and a moderately oxidizing gas mixture is passed through the mass. The temperature should be such as to promote the oxidation of all the sulphides except the lead and zinc and not to sinter or fuse the particles. This is preferably accomplished in a special form of furnace of my invention, which is described and claimed in another application for patent. The $SO_2$ thus formed is collected and utilized at a subsequent stage of the process, as hereinafter described.

After a relatively long oxidizing period of this kind, periods of alternate reduction and oxidation of relatively short duration are employed, as follows:

I now substitute for the oxidizing gas mixture a reducing atmosphere, such as ordinary producer gas or water gas which may or may not be mixed with $CO_2$ or other products of combustion, while maintaining the temperature. It is best to keep the ore mass in slow movement to promote passage of gas through it.

Periods of reducing and oxidizing treatment lasting a few minutes at a time are thus carried on in repeated alternation, the temperature being maintained at about 500 to 650 degrees C. I do not wish to be limited in regard to this temperature range, as it will vary within reasonable limits with different ores.

This process of alternation of oxidizing and reducing is one of the most important features of the invention. In the treatment of complex ores (of which that above described is an example) it has for its main object the elimination of the sulphur from the desired metals except that in the zinc blende.

During each reduction period a certain amount of metallic lead is formed by the reduction of lead oxide or sulphate formed during any previous oxidation, but the greater amount of metallic lead is formed by the desulphurization of the sulphide of lead by metallic iron reduced from its oxides during this period. During these periods the ore will remain in a granular or sandy condition, and no sintering will occur. Also during each reducing period a considerable quantity of $SO_2$ is given off.

During each period of oxidation $SO_2$ gas is also given off, due largely to oxidation the iron sulphide formed during the preceding reduction period. By these alternate oxidations and reductions all of the sulphur in the ore, except that combined with the zinc, can be eliminated; but in some cases it may be more economical to leave a small amount of sulphur in the ore, over and above that combined with the zinc, which will be found combined with the iron or copper or both.

When this process of alternation has been carried on long enough to eliminate practically all the sulphur except that combined with zinc, the ore is subjected in the same manner to a comparatively prolonged period of heating in a reducing atmosphere, in order to reduce to metallic form such iron as has been oxidized. The temperature during this period may vary considerably, say from about 600 to 750 degrees C. By this means metallic iron, copper and lead are obtained, the zinc remaining as a sulphide.

It is one of the principal objects of this invention to provide means for separating the large proportion of iron from other ingredients in the ore treated, in order to facilitate and cheapen the concentration of these latter on concentration tables or in flotation cells or other means. This separation of the iron may be carried on in any suitable manner, and one process which may be utilized in this connection is as follows:

For this purpose the ore, having been treated as above described, is cooled in a reducing atmosphere to prevent oxidation of the metals, and is then mixed with a considerable proportion of water through which is passed the $SO_2$ previously driven off and collected as above stated. This operation dissolves the metallic iron, which is separated in solution by filtration, leaving the other ingredients in the residue which can then be treated for concentration in any well known manner.

The iron solution, after purification, if necessary, may then be evaporated to dryness and roasted, the $SO_2$ given off being collected for use over again. Or such iron may be chemically precipitated dried and roasted. The iron oxides so produced are made valuable in many ways.

The above described treatment by alternate oxidation and reduction may be made useful if desired in the reduction of a simple lead sulphide ore or sulphides of lead and zinc containing little or no iron. For this purpose ground pyrites or iron oxides in suitable quantity is added to the ground galena and the mixture is treated as above described, with the result that the sulphur is gradually taken from the lead by the iron which can afterward be separated as already described.

The separation of iron in metallic form as above described is particularly useful where copper pyrites is found so intimately associated with iron pyrites as to make it very difficult or impossible to separate the two by grinding or other mechanical means.

It will, of course, be understood that my invention is not limited in its application to the particular "complex ore" above specified. It may be used with advantage to treat many other ores, such as those containing sulphides of copper and zinc without lead, or those containing lead carbonate or ores containing a certain amount of bismuth.

It is to be understood that my process may be carried out in various modifications and with many kinds of ores without departing from the scope of my invention. Various forms of apparatus may be employed as will be understood by those skilled in the art, as my present invention is concerned solely with the treatment to which the ore is subjected, whatever may be the means employed. The temperatures used, the periods of time employed in the various steps etc. will vary largely with various ores and should be determined by experiment in each case for the best results.

What I claim is—

1. In the treatment of a sulphide-bearing ore, first heating the ground ore at a relatively low temperature in a slightly reducing or neutral atmosphere and then in a slightly oxidizing atmosphere to cause burning of a portion of the sulphur, whereby a further rise in temperature is caused by burning the sulphur, to complete the process of partial desulphurizing and softening, with the evolution of elemental sulphur.

2. Treating a complex ore containing iron compounds and zinc sulphide by subjecting the same in divided form to a number of alternations of oxidizing and reducing gases while heated to a temperature above 450 degrees C. and low enough to prevent separation of sulphur from the zinc.

3. The process of treating an ore containing pyrites and a sulphide of lead which consists in heating the ground ore while passing through the same an oxidizing and a reducing gas in repeated alternations at a temperature above 450 C. and low enough to prevent sintering.

4. The process of desulphurizing a galena bearing ore consisting in adding pyrites or iron oxides thereto and passing through the ground and heated mixture an oxidizing and a reducing gas in alternation.

5. The process of treating a sulphide bearing ore of the general character described which consists in grinding the same, subjecting it to repeated alternations of oxidation and reduction for relatively short time periods and finally to a more prolonged period of heating in a reducing atmosphere.

6. The process of treating a complex ore containing pyrites consisting in converting the pyrites to metallic iron, subjecting the ore to a solution of $SO_2$ in water and filtering to separate the iron from the other constituents.

7. The process of treating ore containing sulphides of iron, together with sulphides of copper, lead and zinc (some or all) which consists in grinding the ore, heating the mass, passing therethrough a slightly oxidizing gas for a relatively long period and then for shorter periods reducing gases and oxidizing gases in alternation, heating for a relatively long period in a reducing atmosphere, cooling in a non-oxidizing atmosphere, mixing the cooled mass with water, passing $SO_2$ through the mixture, filtering, concentrating the residue, and separating the iron from the filtrate.

In testimony whereof I have affixed my signature.

F. M. SIMONDS.